UNITED STATES PATENT OFFICE.

JULIUS OPPERMANN AND AUGUST FETTE, OF BIEBRICH, GERMANY, ASSIGNORS TO KALLE AND COMPANY, OF SAME PLACE.

PROCESS OF MAKING NITRO AND CHLOR BENZALDEHYDE.

SPECIFICATION forming part of Letters Patent No. 673,887, dated May 14, 1901.

Application filed April 19, 1898. Serial No. 678,116. (No specimens.)

*To all whom it may concern:*

Be it known that we, JULIUS OPPERMANN and AUGUST FETTE, doctors of philosophy, subjects of the King of Prussia, German Emperor, residing at Biebrich-on-the-Rhine, Germany, have invented certain new and useful Improvements in the Manufacture of Ortho-Nitro and Ortho-Chlor Benzaldehyde, of which the following is a specification.

As starting material for the manufacture of ortho-nitro-benzaldehyde, which, as it is known, serves for the production of the artificial indigo, (Imperial German Patents Nos. 19,768 and 73,377, "Indigo" salt,) hitherto the pure ortho-nitro-benzylchlorid was used by converting the same into the nitro-benzaldehyde after the method protected by the Imperial German Patent No. 48,722. The only process which has hitherto been technically carried out for the production of ortho-nitro-benzylchlorid consisted in the nitration of benzylchlorid and separation of the thereby formed isomers. The difficulties, however, under which the manufacturing process hitherto employed was already laboring increased in the same manner as the utilization of the by-products, in particular of the para-nitro-benzylchlorid formed in large quantities, became more difficult and as the demand increased for ortho-nitro-benzaldehyde, or rather for the indigo salt obtained from the same. We have now found out a process which, starting from the cheap ortho-nitro-toluol, permits of producing the ortho-nitro-benzaldehyde in any quantities.

I. If ortho-nitro-toluol is chlorinated at an elevated temperature, it is possible to convert a part of the same into ortho-nitro-benzylchlorid. At the same time other chlorinated products are formed, while the rest remains as unchanged nitro-toluol. It is, however, a matter of extreme difficulty, attended with very great losses, to isolate from this reaction product the pure ortho-nitro-benzylchlorid.

(*a*) If, however, the chlorinated oil liberated from acid by washing with alkaline water is heated with salts of certain inorganic or organic acids in alcoholic solution or in a suspension in water or other suitable liquids, the ortho-nitro-benzylchlorid is transformed into compounds having the nature of ethers, which afterward on cooling or after previously distilling off the alcohol separate out mostly in solid crystalline form. The unchanged ortho-nitro-toluol can now be eliminated from the ortho-nitro-benzylether by distillation with steam or siphoned off in so far as water, soluble ethers, or the salt-like nitrobenzyl derivatives are concerned. The benzyl derivatives separated in this manner are obtained after filtering and pressing in a form, in which they can be directly oxidized to the ortho-nitro-benzaldehyde.

Of the inorganic or organic acids, the salts of which are particularly adapted for converting the nitro-benzylchlorid into ether-like compounds, we mention the following ones: Acetic acid, oxalic acid, benzoic acid, phtalic acid, thiosulfuric acid, (hyposulfurous acid,) sulfocyanic acid, acetate of soda, sodium hyposulfite, sodium sulfocyanid. The conversion of these ether-like compounds into ortho-nitro-benzaldehyde is effected according to the method described in the Imperial German Patent No. 48,722. One can, therefore, as indicated therein, either directly oxidize the ethers or saponify them first by treatment, preferably in alcoholic solution, with caustic alkalies at ordinary temperature or by boiling with alkali carbonates in aqueous or alcoholic solution, so as to obtain the nitro-benzylalcohol and subject the latter afterward to the oxidation process.

(*b*) It is, however, in the production of the ortho-nitro-benzylalcohol not necessary to isolate the ethers previously. One can rather combine the two operations, and thus directly obtain the nitro-benzylalcohol in one operation. To this end one mixes the crude chlorinated oil, previously liberated from acid—for instance, with acetate of soda, soda, and diluted alcohol—and boils at the reflux-cooler until the transformation is finished. The carrying out of this operation, however, necessitates the presence of a salt which renders possible the formation of the intermediately obtained ether. From the nitro-benzylalcohol obtained in this manner the alcohol is first distilled off, then the unchanged nitro-toluol is driven off with steam and the alcohol remaining after cooling as a solid crystalline mass is finally isolated by filtering and pressing.

(c) Since the ethers, and in particular the nitro-benzylalcohol, are much more liable to be attacked by oxidizing agents than the nitro-toluol, one can also proceed in such a manner that the whole mixture obtained after the formation of the ether or after saponification of the ether or after directly converting into the alcohol is subjected to the oxidation. The thus-obtained ortho-nitro-benzaldehyde is then separated from the unchanged nitro-toluol, for instance, by treatment with bisulfite.

II. As we have found, one obtains by chlorinating the ortho-nitro-toluol at elevated temperatures not only ortho-nitro-benzylchlorid, but always also ortho-chlor-benzylchlorid, apart from other products formed in small quantities. This is caused by the chlorin acting upon the ortho-nitro-toluol partly by eliminating the nitro group and substituting it by chlorin. Subsequently the normal action of the chlorin upon the $CH_3$ group takes place. Under suitable conditions it is possible to conduct the chlorination in such a manner as to obtain the ortho-chlor-benzylchlorid in larger quantities than ortho-nitro-benzylchlorid.

(a) The isolation of the ortho-chlor-benzylchlorid from the chlorinated product is possible, but causes great losses. One succeeds, however, easily in transforming this product without previous isolation into the very valuable ortho-chlor-benzaldehyde. The ortho-chlor-benzylchlorid is also converted into ether-like compounds by treatment with the salts of certain organic or inorganic acids. One can now oxidize either directly the ethers or the ortho-chlor-benzylalcohol obtained from them by saponification, so as to form the ortho-chlor-benzaldehyde. The separation of the two aldehydes, that of the ortho-nitro-benzaldehyde from the ortho-chlor-benzaldehyde, is effected without any difficulty, as the nitro-benzaldehyde is solid and can be distilled only very difficultly with steam, whereas the ortho-chlor-benzaldehyde is liquid at an ordinary temperature and can be very easily distilled over with steam. The mixture of the two aldehydes is therefore subjected to the distillation with steam, which is continued until crystals of ortho-nitro-benzaldehyde appear in the liquid distilling over.

(b) The separation of the two ortho-substituted benzylalcohols can be effected very easily. The ortho-nitro-benzylalcohol is scarcely volatile with steam, while the ortho-chlor-benzylalcohol can be easily distilled over with steam. The crude chlorinated oil freed from acid by treatment with alkaline water is heated on the water-bath with sodium acetate and alcohol for seventy to eighty hours. By this the ortho-nitro and ortho-chlor benzyl acetate are formed. The alcohol is now distilled off and afterward the unchanged ortho-nitro-toluol is driven off by steam. On cooling the two ethers are obtained in oily form. These ethers can now be transformed into the corresponding alcohols either by treatment with caustic alkalies in alcoholic solution at ordinary temperature or by heating them with water and alkali carbonates. On distillation with steam the ortho-chlor-benzylalcohol is now driven over, while the ortho-nitro-benzylalcohol remains. The ortho-chlor-benzylalcohol is soluble in water and crystallizes from an aqueous solution in white needles, melting at 72° centigrade. Also in producing the ortho-chlor-benzylalcohol it is not necessary to isolate the ethers obtained as intermediate products. In fact it is much better to proceed in such a manner that the washed oil is boiled at the reflux-cooler with a suitable salt—such as sodium acetate, dilute alcohol, and alkali carbonate—until the intermediately-formed ethers are saponified. After distilling off the alcohol the benzylalcohols formed separate in a crystalline state. The unchanged ortho-nitro-toluol and the ortho-chlor-benzylalcohol can be driven off from the ortho-nitro-benzylalcohol by distillation with steam. From the last fractions of the aqueous distillate the ortho-chlor-benzylalcohol crystallizes in long needles.

(c) The oxidation of the ortho-chlor-benzyl acetate or of the ortho-chlor-benzylalcohol to the corresponding aldehyde is best effected by means of nitric acid. One can, however, employ also other oxidizing agents for this purpose—as, for instance, peroxid of lead.

Example: One hundred and forty-two kilos ortho-chlor-benzylalcohol are heated up with six hundred kilos sulfuric acid of about 55° Baumé under good agitation in a closed vessel, (temperature about 40° centigrade.) One hundred and twenty kilos of a mixture of nitric and sulfuric acid containing forty per cent. $HNO_3$ are then slowly added. The beginning of the oxidation is seen by the appearance of red vapors escaping through the pipe mounted on the lid of the vessel. An excessively-high temperature which may be caused by the reaction is best avoided by cooling now and again from outside with cold water. As soon as the escape of nitrous gas ceases the mass is run into six hundred liters cold water. The separated aldehyde is filtered off the acid liquid and treated with soda solution in order to remove the last traces of acid.

(d) The oxidation of the chlor-benzylethers or of the chlor-benzylalcohol can also be effected before these products are separated from the unchanged ortho-nitro-toluol, since the substituted benzyl derivatives are much easier attacked by oxidizing agents than the nitro-toluol.

III. After having described the properties of the products obtained by chlorinating ortho-nitro-toluol we are now going to explain our new process for the production of orthonitro-benzaldehyde and ortho-chlor-benzaldehyde from chlorinated ortho-nitro-toluol by giving some examples.

First. Two hundred and fifty kilos crude chlorinated oil (containing, for instance, forty per cent. of benzylchlorid derivatives) are heated to about 60° centigrade with two hundred kilos crystallized sodium hyposulfite and one hundred to two hundred kilos water until the transformation is complete, which is mostly the case after fifteen hours. The product of the reaction which is then partly separated out is dissolved again by adding warm water, and the unchanged ortho-nitro-toluol is drawn off the aqueous solution. From the latter the sodium ortho-nitro-benzylhyposulfite crystallizes out mixed with other products of the reaction. The separation is completed by adding common salt. The so-obtained crude product can be purified after filtering and pressing by fractional crystallization.

Second. Six hundred kilos chlorinated oil, containing about forty per cent. of benzylchlorid derivatives, are boiled at the reflux-cooler with eight hundred liters dilute alcohol, two hundred and fifty kilos crystallized sodium acetate, and ninety kilos soda ash until the intermediately-formed ortho-nitro and ortho-chlor-benzyl acetate are saponified. The alcohol is now distilled off. On cooling a mixture of the corresponding substituted alcohols crystallizes out from the reaction mass. It is, however, not necessary to wait for this. After distilling off the alcohol the ortho-nitro-toluol is distilled over with steam. The residue is diluted with water, if necessary, in order to keep the salts (sodium acetate, sodium chlorid, &c.) in solution. After cooling the benzylalcohol derivatives turn solid and are filtered off and pressed. One hundred and thirty kilos of the press-cake are dissolved in four hundred to five hundred kilos sulfuric acid of 50° to 60° Baumé at a temperature of about 40° centigrade. Seventy to eighty kilos of a mixture of sulfuric and nitric acid, containing thirty-eight to thirty-nine per cent. $HNO_3$ or a corresponding quantity of nitric acid or niter, are now added slowly. The beginning of the oxidation can be seen by the escape of nitrous gas, and the end of the same by the ceasing of this escape. The temperature is best kept at 40° centigrade as long as the oxidation lasts, and for this purpose one cools, if necessary, with water. After the oxidation is finished the mass is run into five hundred liters of cold water. After letting the mixture rest for a while the aldehydes are separated from the acid and the last traces of acid are removed by washing with soda solution. The remaining mixture of the two aldehydes is then filtered and pressed. From the pressed-off oil one obtains the ortho-chlor-benzaldehyde by fractional distillation with steam. The press-cakes consist of ortho-nitro-benzaldehyde which is sufficiently pure for technical purposes. They can, however, be purified by treatment with bisulfite and by distillation with steam in order to remove the last traces of ortho-chlor-benzaldehyde.

Third. Six hundred kilos chlorinated oil (containing about forty per cent. of benzylchlorid derivatives) are boiled at the reflux-cooler with eight hundred liters dilute alcohol, two hundred and fifty kilos crystallized sodium acetate, and ninety kilos soda ash until the intermediately-formed ortho-nitro and ortho-chlor-benzyl acetates are saponified. The alcohol is now distilled off. In order to keep the salts (sodium acetate, sodium chlorid, &c.) in solution, some water is added. The oily mixture, containing ortho-nitro-toluol, ortho-nitro-benzylalcohol, and ortho-chlor-benzylalcohol, is separated from the aqueous-salt solution and directly oxidized. For this purpose it is mixed with five hundred to six hundred kilos sulfuric acid of 50° to 60° Baumé and oxidized under good agitation at 40° centigrade in the manner described in Example 2. The oxidized mass is run into six hundred liters cold water. The oil is separated from the acid and washed with soda solution. In order to separate the aldehydes from the ortho-nitro-toluol, the oil is now mixed at a temperature of 30° to 40° centigrade with dilute bisulfite solution. The undissolved ortho-nitro-toluol is separated from the aldehyde-bisulfite solution, and the latter is decomposed by adding an equivalent amount of caustic-soda lye. The precipitated aldehydes are filtered off and pressed. The ortho-nitro-benzaldehyde is contained in the press-cakes, the ortho-chlor-benzaldehyde in the pressed-off oil. One can also separate the two aldehydes by distillation with steam. The distillation is continued until one observes that the solid ortho-nitro-benzaldehyde begins to distil over. In this case the ortho-chlor-benzaldehyde is contained in the distillate, while the ortho-nitro-benzaldehyde remains in the residue.

The by-products formed in small quantities besides the ortho-nitro and ortho-chlor-benzylchlorid in the chlorinating process do not impair the described process in any way. In the English Patent No. 22,041 of 1896 also a process for producing ortho-nitro-benzaldehyde from such a chlorinated product is described which contains besides unchanged ortho-nitro-toluol only ortho-nitro-benzylchlorid. The process is carried out as follows: The chlorinated product is treaded with primary amins or amidosulfo-acids. In this manner the amids or amidosulfo-acids of the ortho-nitro-benzyl are obtained. These are separated from the unchanged ortho-nitro-toluol either by distillation with steam or, in so far as amidosulfo-acids of the ortho-nitro-benzyl come into question, by the solubility of these products in water. This mode of separation can also be applied with advantage to the ortho-chlorinated benzylchlorid.

Now what we claim is—

1. As a new process, the manufacture of a mixture of ortho-nitro and ortho-chlor benzaldehyde from chlorinated ortho-nitro-toluol, and the separation of the two aldehydes from each other, by boiling chlorinated ortho-nitro-toluol, previously freed from acid with dilute alcohol, sodium acetate and sodium carbonate, distilling off the alcohol, oxidizing the remaining oil, after separating it from the salt solution, by a suitable treatment with a mixture of sulfuric and nitric acid, thereby transforming it into a mixture of ortho-nitro-toluol and ortho-nitro and ortho-chlor benzaldehyde and separating the aldehydes from the ortho-nitro-toluol by means of an alkali bisulfite, liberating them from the bisulfite solution by addition of a caustic alkali and separating the two aldehydes from each other by pressing or distillation with steam, substantially as described.

2. As a new process, the manufacture of a mixture of ortho-nitro and ortho-chlor benzaldehyde from chlorinated ortho-nitro-toluol and the separation of the two aldehydes from each other by boiling chlorinated ortho-nitro-toluol, previously freed from acid with dilute alcohol, sodium acetate and sodium carbonate, distilling off the alcohol, separating the oil from the salt solution and treating the oil so obtained with a current of steam, thereby driving over the ortho-nitro-toluol, oxidizing the remaining mixture of ortho-nitro and ortho-chlor-benzyl alcohol, and separating the two aldehydes from each other, substantially as described.

3. As a new process, the manufacture of a mixture of ortho-nitro and ortho-chlor benzaldehyde from chlorinated ortho-nitro-toluol and the separation of the two aldehydes from each other by boiling chlorinated ortho-nitro-toluol, previously freed from acid with dilute alcohol, sodium acetate and sodium carbonate, distilling off the alcohol, separating the oil from the salt solution, then treating the oil so obtained with a current of steam, until not only the ortho-nitro-toluol but also the ortho-chlor-benzyl alcohol is driven over, and transforming the two alcohols separated in this manner into the aldehydes, substantially as described.

In testimony whereof we have signed our names to this specification in the presence of two subscribing witnesses.

JULIUS OPPERMANN. [L. S.]
  AUGUST FETTE. [L. S.]

Witnesses:
 HEINRICH MISCHLER,
 WALTER HANSING.